United States Patent
Tada

(10) Patent No.: US 9,685,188 B2
(45) Date of Patent: Jun. 20, 2017

(54) RECORDING MEDIUM AND MANUFACTURING METHOD OF RECORDING MEDIUM

(71) Applicant: Sony Corporation, Tokyo (JP)

(72) Inventor: Satoshi Tada, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/666,960

(22) Filed: Mar. 24, 2015

(65) Prior Publication Data
US 2015/0279412 A1   Oct. 1, 2015

(51) Int. Cl.
| | |
|---|---|
| *B41M 5/50* | (2006.01) |
| *G11B 7/251* | (2006.01) |
| *B41M 5/52* | (2006.01) |
| *G11B 7/26* | (2006.01) |
| *G11B 7/24094* | (2013.01) |
| *C08K 7/26* | (2006.01) |

(52) U.S. Cl.
CPC .......... *G11B 7/251* (2013.01); *B41M 5/5218* (2013.01); *G11B 7/24094* (2013.01); *G11B 7/26* (2013.01); *C08K 7/26* (2013.01); *C08K 2201/003* (2013.01); *G11B 7/266* (2013.01); *Y10T 428/249974* (2015.04); *Y10T 428/259* (2015.01)

(58) Field of Classification Search
CPC .... B41M 5/50; B41M 5/5218; Y10T 428/259
USPC ........... 428/42.37, 64.4, 331, 32.37; 427/387
See application file for complete search history.

(56) References Cited

FOREIGN PATENT DOCUMENTS

JP     2006-260748     9/2006

*Primary Examiner* — Bruce H Hess
(74) *Attorney, Agent, or Firm* — K&L Gates LLP

(57) ABSTRACT

Provided is a recording medium including an ink receiving layer. The ink receiving layer includes a hydrophilic resin and a low oil absorbing porous silica.

9 Claims, 2 Drawing Sheets

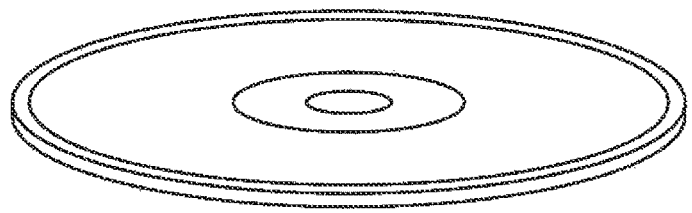
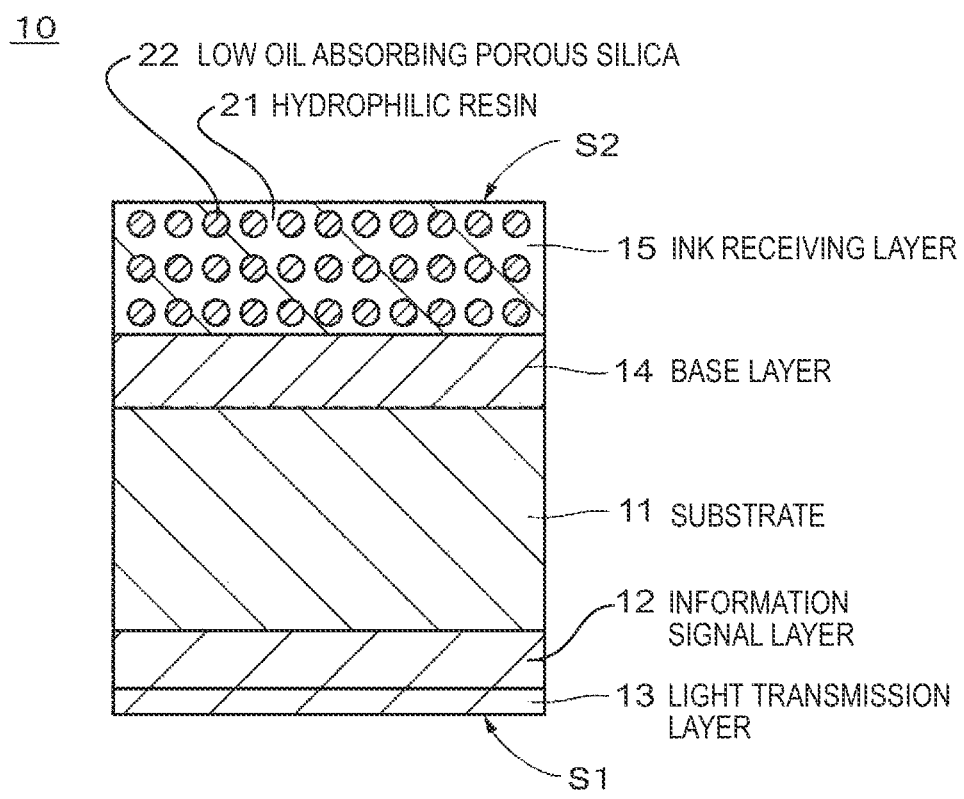

RECORDING MEDIUM AND MANUFACTURING METHOD OF RECORDING MEDIUM

CROSS REFERENCES TO RELATED APPLICATIONS

The present application claims priority to Japanese Priority Patent Application JP 2014-074951 filed in the Japan Patent Office on Mar. 31, 2014, the entire content of which is hereby incorporated by reference.

BACKGROUND

The present application relates to a recording medium having a printable surface, and a manufacturing method of the recording medium.

There has been developed an optical recording medium in which an ink receiving surface that receives aqueous ink is disposed on an opposite side to a signal surface that receives incident recording light and reproducing light, thereby enabling formation of image with aqueous ink using an inkjet printer.

In JP 2006-260748A, there is disclosed an optical information recording medium being excellent in printing performance, in which an ink absorptive porous layer including a resin film containing gas phase process inorganic powder is disposed as a layer on which image is to be formed, in order to improve absorption and fixity of ink on the layer on which image is to be formed.

SUMMARY

Therefore, it is desirable to provide a recording medium being excellent in printing performance and a manufacturing method of the recording medium.

According to an embodiment of the present application, there is provided a recording medium including an ink receiving layer. The ink receiving layer includes a hydrophilic resin and a low oil absorbing porous silica.

According to another embodiment of the present application, there is provided a manufacturing method of a recording medium, the method including applying a paint containing a hydrophilic resin and a low oil absorbing porous silica on a substrate, and emitting UV light on the applied paint for curing.

As described above, according to one or more of embodiments of the present application, the recording medium being excellent in printing performance can be achieved.

Additional features and advantages are described herein, and will be apparent from the following Detailed Description and the figures.

BRIEF DESCRIPTION OF THE FIGURES

FIG. 1A is a perspective view illustrating an example of an appearance of an optical recording medium according to an embodiment of the present application. FIG. 1B is a schematic cross-sectional view illustrating an example of a configuration of an optical recording medium according to an embodiment of the present application.

DETAILED DESCRIPTION

Figure 2:
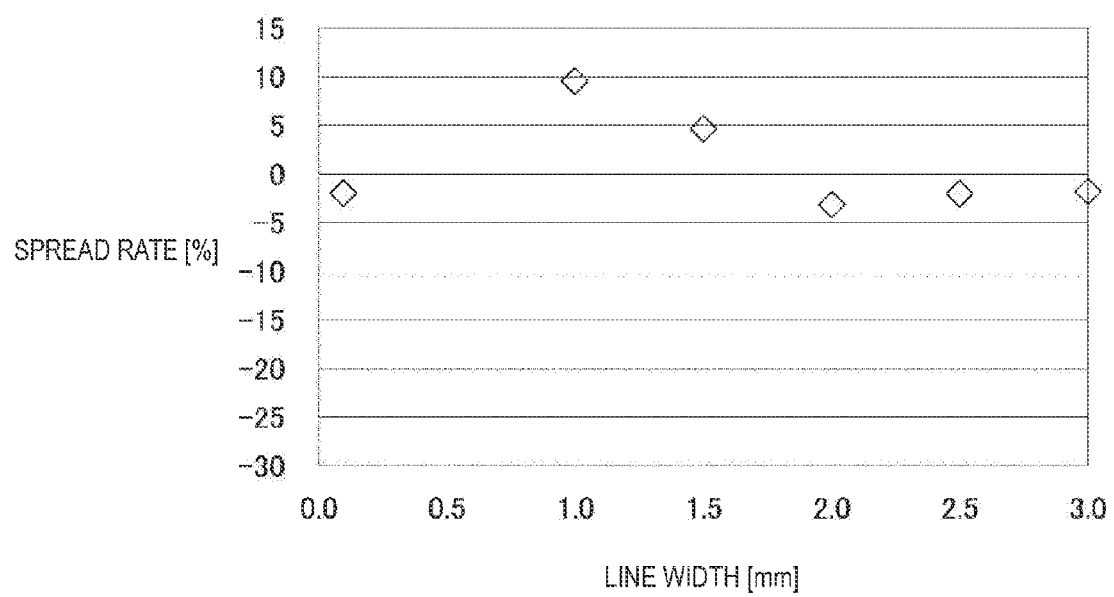
FIG. 2 is a diagram illustrating a relationship between a print line width and a spread rate of an optical disk of Sample 3-1.

In an embodiment of the present application, the recording medium preferably has a configuration in which one or a plurality of information signal layers are disposed on a substrate, and a cover layer is disposed on the information signal layer. The thickness of this cover layer is not particularly limited. The cover layer includes a substrate, a sheet, a coating layer or the like. Since a high NA objective lens is used in a high-density optical recording medium, it is preferred to employ a thin light transmission layer such as a sheet and a coating layer as the cover layer so that irradiation with light from this light transmission layer side allows information signals to be recorded or reproduced. In this case, an employed substrate may also be opaque. A light incident surface for recording or reproducing information signals is appropriately set on one of the cover layer side and the substrate side depending on the format of an optical recording medium.

In another embodiment of the present application, a receiving layer may be disposed on a surface on either the substrate side or the cover layer side. From the viewpoint of improving visibility of image such as printed letters and pictures, it is preferred to further include a base layer under the receiving layer. More specifically, when the receiving layer is disposed on a surface on the substrate side, the base layer is preferably disposed between the substrate and the receiving layer, and when the receiving layer is disposed on a surface on the cover layer side, the base plate is preferably disposed between the cover layer and the receiving layer.

In another embodiment of the present application, the recording medium is preferably, but not limited to, a reproduction only-type, recordable-type or rewritable-type optical recording medium. The recording medium may also be a medium other than the optical recording medium. The recording medium preferably includes one or a plurality of information signal layers. The information signal layer to be used may be, for example, of reproduction only-type, recordable-type or rewritable-type.

Embodiments of the present application will be described in the following order.
1. Configuration of optical recording medium
2. Manufacturing method of optical recording medium
3. Effects

[1. Configuration of Optical Recording Medium]

As illustrated in FIG. 1A, an optical recording medium 10 according to an embodiment of the present application has a disc shape in which an opening (hereinafter referred to as a center hole) is disposed in a center. It is noted that the shape of the optical recording medium 10 is not limited to this example, and may be a card-like shape.

As illustrated in FIG. 1B, the optical recording medium 10 includes a substrate 11, an information signal layer 12 disposed on one (a first main surface) of main surfaces of the substrate 11, and a light transmission layer 13 disposed on this information signal layer 12. The optical recording medium 10 further includes a base layer 14 disposed on the other (a second main surface) of the main surfaces of the substrate 11, and an ink receiving layer 15 disposed on this base layer 14. Here, an example in which the information signal layer 12 is disposed as a single layer will be described. However, the number of information signal layers is not limited to this example, and may be two or more. In that case, an intermediate layer is disposed between the information signal layers.

The optical recording medium 10 has a signal surface (first surface) S1 on the light transmission layer 13 side, and a print surface (second surface) S2 on the ink receiving layer 15 side that is opposite side to the signal surface S1. The signal surface S1 is a surface (i.e., a light-irradiated surface) that is irradiated with laser light for recording or reproducing information signals to the information signal layer 12. On the other hand, the print surface S2 is a surface that is subjected to printing by a printing process such as an inkjet process. Image to be printed on this print surface S2 is not particularly limited, and examples of the image may include photographs, letters, pictures patterns, and a combination of two or more thereof.

In the optical recording medium 10, the information signal layer 12 is irradiated with laser light from the signal surface S1 on the light transmission layer 13 side to record and reproduce information signals. For example, laser light having a wavelength of not less than 400 nm and not more than 410 nm is concentrated on an objective lens having a numerical aperture of not less than 0.84 and not more than 0.86, so that the information signal layer 12 is irradiated from the light transmission layer 13 side to record and reproduce information signals. An example of such an optical recording medium 10 may include a multilayer Blu-ray Disc (BD (registered trademark)).

Hereinafter, the substrate 11, the information signal layer 12, the light transmission layer 13, the base layer 14 and the ink receiving layer 15 each constituting the optical recording medium 10 will be sequentially described.

(Substrate)

The substrate 11 has a disc shape in which a center hole is disposed in a center. One of the main surfaces of this substrate 11 is, for example, a concave-convex surface, and the information signal layer 12 is formed on this concave-convex surface. Hereinafter, a concave portion of the concave-convex surface is referred to as a land, and a convex portion is referred to as a groove.

The land and groove may have various shapes such as a spiral shape and a concentric circular shape. Also, for example, one or both of the land and groove are wobbled (meander) in order to stabilize a linear velocity or add address information.

The size (diameter) of the substrate 11 is selected to be, for example, 120 mm. The thickness of the substrate 11 is selected in consideration of stiffness, and is preferably not less than 0.3 mm and not more than 1.3 mm, and more preferably not less than 0.6 mm and not more than 1.3 mm. For example, the thickness is selected to be 1.1 mm. Also, the size (diameter) of the center hole is selected to be, for example, 15 mm.

Examples of the material of the substrate 11 may include plastic materials and glass, and plastic materials are preferably used from the viewpoint of cost. Examples of the plastic materials to be used may include polycarbonate-based resins, polyolefin-based resins and acrylic-based resins.

(Information Signal Layer)

The information signal layer 12 contains, for example, a reproduction only-type, recordable-type or rewritable-type recording layer. The information signal layer may have a laminated structure containing at least a recording layer. The configuration thereof is defined depending on the properties that are necessary in an optical recording medium, such as signal properties and durability.

(Light Transmission Layer)

An example of the light transmission layer 13 is a resin layer obtained by curing a photosensitive resin such as a UV curable resin. An example of the material of this resin layer may include UV curable acrylic-based resins. The light transmission layer 13 may also be constituted by a light transmissive sheet having an circular ring shape, and an adhesive layer for bonding this light transmissive sheet to the substrate 11. The light transmissive sheet preferably includes a material having low absorbing power to the laser light used for recording and reproduction, and specifically preferably includes a material having a transmittance of not less than 90%. Examples of the material of the light transmissive sheet to be used may include polycarbonate resin materials and polyolefin-based resins (for example, Zeonex (registered trademark)). Examples of the material of the adhesive layer to be used may include UV curable resins and a pressure sensitive adhesive (PSA).

The thickness of the light transmission layer 13 is preferably selected from the range of not less than 10 µm and not more than 177 µm. For example, the thickness is selected to be 100 µm. Such a thin light transmission layer 13 is combined with, for example, an objective lens having a high numerical aperture (NA) of approximately 0.85, thereby achieving high density recording.

(Base Layer)

The base layer 14 is a white base layer for, for example, improving color development of the image printed on the print surface S2. The base layer 14 contains UV curable resins, a white pigment and various additives as necessary. An example of the UV curable resins to be used may include, but not limited to, acrylic-based UV curable resins. An example of the white pigment to be used may include, but not limited to, white metal oxides such as titanium oxides.

(Ink Receiving Layer)

The arithmetic average roughness Ra of the surface (print surface S2) of the ink receiving layer 15 is preferably not more than 114 µm, more preferably not more than 52 µm, and further more preferably not more than 25 µm, from the viewpoint of improving gloss properties of the print surface S2.

The gloss value of the surface (print surface S2) of the ink receiving layer 15 is preferably not less than 22%, more preferably not less than 45%, and further more preferably not less than 67%, from the viewpoint of improving gloss properties of the print surface S2.

The ink receiving layer 15 contains a hydrophilic resin 21, a low oil absorbing porous silica 22, and a UV curable resin. The ink receiving layer 15 may contain at least one of a filler, a fixing agent, a water absorbing powder and the like, as necessary. The hydrophilic resin may also function as a UV curable resin.

The hydrophilic resin 21 is a resin that dissolves or swells in water. Specifically, the hydrophilic resin 21 is preferably a compound having in the molecule a functional group such as a carboxy group, hydroxyl group, sulfonic acid (sulfonate) group, phosphonic acid (phosphonate) group, amino group, amide group and quaternary ammonium salt group.

Examples of the hydrophilic resin 21 to be used may include one of polyvinyl alcohol, acryl, polyurethane, polyethylene glycol and cellulose, or a combination of two or more thereof. A preferred example of the hydrophilic resin 21 to be used is a cationic hydrophilic resin. An example of such a hydrophilic resin to be used may include a reaction product between a resin and a halide. The resin is obtained from diisocyanate and a compound in which a divalent organic group having at least a cationizable amino group is combined with one or both of a hydroxyl group and an amino group. The halide is a combined product of alcohols or ethers both having hydrophilicity and halogen. In the reaction product, the cationizable amino group is cationized.

An example of the UV curable resin to be used may include, but not limited to, acrylic-based UV curable resins. Examples of the fixing agent to be used may include one of antimony salts such as antimony potassium tartrate and sodium carbonates such as sodium alginate, sodium hexametaphosphate, soda ash and tannic acid, or a combination of two or more thereof.

The oil absorbing amount of the low oil absorbing porous silica 22 is preferably not more than 15 ml/100 g, more preferably not more than 10 ml/100 g, further more preferably not more than 5 ml/100 g, and most preferably not more than 1 ml/100 g, from the viewpoint of printing performance.

The average particle size (diameter) of the low oil absorbing porous silica 22 is preferably not more than 5 μm. The average particle size exceeding 5 μm tends to reduce the gloss value and gloss properties.

The content of the low oil absorbing porous silica 22 in the ink receiving layer 15 is preferably not less than 20 at % and not more than 30 at %. The content less than 20 at % tends to inhibit ink from sufficiently permeating in the thickness direction of the ink receiving layer 15 when the print surface S2 is subjected to printing by an inkjet process or the like, thereby reducing printing performance. The content exceeding 30 at % tends to reduce the gloss value and gloss properties.

The spread rate when printing ink is placed on the ink receiving layer 15 is preferably not more than 10%. The spread rate exceeding 10% tends to deteriorate sharpness of image when the print surface S2 is subjected to printing by an inkjet process or the like. Furthermore, occurrence of excessive spread may destroy image itself.

The thickness of the ink receiving layer 15 is preferably not less than 10 and not more than 20 μm. The thickness less than 10 μm tends to increase the spread rate of ink (for example, inkjet ink) when the print surface S2 is subjected to printing by an inkjet process or the like. On the other hand, the thickness exceeding 20 μm tends to increase warpage of the optical recording medium 10.

The ink receiving layer 15 preferably contains a fixing agent. This is because the fixing agent can electrically combine with the hydrophilic resin 21 thereby to improve water resistance and moisture resistance.

The spread rate after a water resistance test is preferably not more than 50%. This is because excellent water resistance properties can be provided to the print surface S2 of the optical recording medium 10. It is noted that the spread rate of ink after a water resistance test is calculated according to the following formula.

Ink spread rate after water resistance test [%]=[(Print line width before water resistance test)/(Print line width after water resistance test)×100]−100

The spread rate of ink after a moisture resistance test is preferably not more than 50%. This is because excellent moisture resistance properties can be provided to the print surface S2 of the optical recording medium 10. It is noted that the spread rate of ink after a moisture resistance test is calculated according to the following formula.

Ink spread rate after moisture resistance test [%]= [(Print line width before moisture resistance test)/(Print line width after moisture resistance test)×100]−100

[2. Manufacturing Method of Optical Recording Medium]

First, the optical recording medium 10 in which the information signal layer 12 and the light transmission layer 13 are laminated on the substrate 11 is prepared. Next, a base layer forming paint is printed on a surface (back surface) on the substrate 11 side of the optical recording medium 10 by, for example, silk screen printing to form a coat. Then, this coat is irradiated with UV light to be cured, thereby to form the base layer 14.

Next, an ink receiving layer forming paint containing the hydrophilic resin, the low oil absorbing porous silica, and the UV curable resin is printed on the base layer 14 by, for example, silk screen printing, thereby to form a coat. The ink receiving layer forming paint may further include at least one of a filler, a fixing agent, a water absorbing powder and the like as necessary. Next, this coat is irradiated with UV light to be cured, thereby to form the ink receiving layer 15. Thus, the intended optical recording medium 10 is obtained.

[3. Effects]

In the optical recording medium 10 according to the present embodiment, when ink is dropped on the print surface S2 by a printing process such as an inkjet process, the ink permeates in the thickness direction of the ink receiving layer 15 through the low oil absorbing porous silica 22 contained in the ink receiving layer 15. Accordingly, there can be achieved the optical recording medium 10 having the print surface S2 being excellent in printing performance.

In the optical recording medium 10 according to the present embodiment, the ink receiving layer 15 can be formed using a silk screen printing machine. That is, the ink receiving layer 15 can be formed without using facilities such as a specialized printing machine, and thus has high versatility. Therefore, the optical recording medium 10 having the ink receiving layer 15 can be manufactured at low cost. Furthermore, when the average particle size of the low oil absorbing porous silica 22 is set to be not more than 5 μm, excellent gloss properties can be provided to the print surface S2 of the optical recording medium 10.

When the ink receiving layer 15 includes a cationic hydrophilic resin 21, the cationic hydrophilic resin 21 contained in the ink receiving layer 15 combines with anionic ink permeating in the thickness direction of the ink receiving layer 15, through a reaction such as a cation polymerization reaction. This improves water resistance of the ink receiving layer 15.

EXAMPLES

Although the present application will be specifically described below with reference to examples, the present application is not limited to only these examples.

In the present application, the mean particle size of the low oil absorbing porous silica was calculated as below. That is, the low oil absorbing porous silica was observed using a scanning electron microscope (SEM), and the average (arithmetic average) of the particle sizes (diameters) of an optional plurality of particles of the observed low oil absorbing porous silica was simply calculated to obtain the average particle size (average diameter) of the low oil absorbing porous silica.

The present examples will be described in the following order.

i. Oil absorption amount of low oil absorbing porous silica
ii. Average particle size of low oil absorbing porous silica
iii. Spread rate to print line width
iv. Thickness of ink receiving layer <i. Oil Absorption Amount of Low Oil Absorbing Porous Silica>

(Samples 1-1 to 1-5)

There was prepared an ink receiving layer forming paint containing 25 parts by mass of the hydrophilic resin, 30 parts by mass of the low oil absorbing porous silica, 20 parts by mass of the UV curable resin, and 5 parts by mass of the fixing agent. It is noted that the oil absorption amount of the low oil absorbing porous silica used varies for each sample as illustrated in Table 1.

(Evaluation of Screen Printing Performance)

The ink receiving layer forming paint prepared as described above was applied on a white base layer by silk screen printing, and evaluated for printing performance according to the following criteria. However, Samples 1-4 and 1-5 failed to form a paint, and thus were not evaluated for printing performance. This is because the oil absorption amounts of Samples 1-4 and 1-5 were extremely high, causing the low oil absorbing porous silica to absorb an extremely large amount of liquid component of the ink receiving layer forming paint.

Excellent: Printing performance is excellent.
Good: Printing performance is good.
Fair: Printing performance is within allowable range.
Poor: Printing performance is poor.

Table 1 illustrates evaluation results for printing performance of the ink receiving layer forming paints of Samples 1-1 to 1-5.

TABLE 1

| | Oil absorption amount of silica [ml/100 g] | Average particle size of silica [μm] | Formulation amount of silica [at %] | Screen printing performance |
|---|---|---|---|---|
| Sample 1-1 | 1 | 0.5 | 30 | Excellent |
| Sample 1-2 | 5 | 0.5 | 30 | Good |
| Sample 1-3 | 10 | 0.5 | 30 | Fair |
| Sample 1-4 | 20 | 0.5 | 30 | Paint not formed |
| Sample 1-5 | 30 | 0.5 | 30 | Paint not formed |

From the above evaluation results, it can be seen that from the viewpoint of printing performance, the oil absorption amount of the low oil absorbing porous silica is preferably not more than 15 ml/100 g, more preferably not more than 10 ml/100 g, further more preferably not more than 5 ml/100 g, and most preferably not more than 1 ml/100 g.

<ii. Average Particle Size of Low Oil Absorbing Porous Silica>

(Samples 2-1 to 2-4)

As illustrated in Table 2, an ink receiving layer forming paint was prepared in a similar manner to Sample 1-1, except that the low oil absorbing porous silica has a varied average particle size for each sample. Next, a white base layer was formed on a surface (back surface) on a substrate side of a Blu-ray Disc. Next, the prepared ink receiving layer forming paint was printed on the white base layer by silk screen printing, thereby to form a coat. Next, the coat was irradiated with UV light to be cured. Accordingly, an intended optical disk was obtained.

(Evaluation)

The optical disks of Samples 2-1 to 2-4 obtained as described above were evaluated as below.

(Evaluation of Gloss Value)

Using a gloss meter, a gloss value to an incident angle of 65 degrees was measured.

(Evaluation of Arithmetic Average Roughness Ra)

Using a stylus-type surface roughness measuring instrument (manufactured by Kosaka Laboratory Ltd., trade name: Surfcorder ET4000), an arithmetic average roughness Ra was evaluated.

(Evaluation of Gloss Properties)

Based on the gloss value measured as described above, the gloss properties of the optical disk were evaluated according to the following criteria.

Excellent: Gloss value is not less than 60%.
Good: Gloss value is not less than 40% and less than 60%.
Fair: Gloss value is not less than 20% and less than 40%.
Poor: Gloss value is less than 20%.

(Evaluation of Spread Rate)

The spread rates of Samples 2-1 to 2-4 obtained as described above were evaluated as below. First, a line having a predetermined width was printed on the print surface of the optical disk using an inkjet printing machine. Then, the width of the line immediately after the printing was measured. Next, the printed optical disk was left to stand for 24 hours, and then subjected to a water resistance test in which the optical disk was immersed in water. Thereafter, the width of the line after the water resistance test was measured. Next, using the following formula, the spread rate after the water resistance test was calculated.

Spread rate [%]=[(Line width immediately after printing)/(Line width after water resistance test)×100]−100

Table 2 illustrates evaluation results of the optical disks of Samples 2-1 to 2-4.

TABLE 2

| | Oil absorption amount of silica [ml/100 g] | Average particle size of silica [μm] | Formulation amount of silica [at %] | Gloss [%] | Arithmetic average roughness Ra [μm] | Thickness of receiving layer [μm] | Spread amount [%] | Gloss properties |
|---|---|---|---|---|---|---|---|---|
| Sample 2-1 | 1 | 0.5 or less | 30 | 67 | 25 | 15 | 38 | Excellent |
| Sample 2-2 | 1 | 1.0 | 30 | 45 | 52 | 15 | 36 | Good |
| Sample 2-3 | 1 | 5.0 | 30 | 22 | 114 | 15 | 36 | Fair |
| Sample 2-4 | 1 | 10.0 | 30 | 12 | 221 | 15 | 35 | Poor |

From the above evaluation results, the average particle size of the low oil absorbing porous silica is preferably not more than 5 μm, more preferably not more than 1 μm, and further more preferably not more than 0.5 μm, from the viewpoint of improving gloss properties of the print surface.

The arithmetic average roughness Ra of the surface (print surface) of the ink receiving layer is preferably not more than 114 μm, more preferably not more than 52 μm, and further more preferably not more than 25 μm, from the viewpoint of improving gloss properties of the print surface.

The gloss value of the surface (print surface) of the ink receiving layer is preferably not less than 22%, more preferably not less than 45%, and further more preferably not less than 67%, from the viewpoint of improving gloss properties of the print surface.

<iii. Spread Rate to Print Line Width>

(Sample 3-1)

An ink receiving layer forming paint was prepared in a similar manner to Sample 1-1. Next, a white base layer was formed on a surface (back surface) on a substrate side of a Blu-ray Disc. Next, the prepared ink receiving layer forming paint was printed on the white base layer by silk screen printing, thereby to form a coat. Thereafter, the coat was irradiated with UV light to be cured. Accordingly, an intended optical disk was obtained.

(Evaluation of Spread Rate)

The spread rate of Sample 3-1 obtained as described above was evaluated as below. First, a line having a predetermined width was printed on a print surface of the optical disk using an inkjet printing machine. Then, the width of the line immediately after the printing was measured. Next, using the following formula, the spread rate was calculated. The result is illustrated in FIG. 2.

Spread rate [%]=[(Line width immediately after printing)/(Line width set by printing machine)×100]−100

From the above evaluation result, the spread rate when printing ink was placed on the ink receiving layer is suppressed to not more than 10%.

<v. Thickness of ink Receiving Layer>

(Samples 4-1 to 4-5)

An ink receiving layer forming paint was prepared in a similar manner to Sample 1-1. Next, a white base layer was formed on a surface (back surface) on a substrate side of a Blu-ray Disc. Next, the prepared ink receiving layer forming paint was printed on the white base layer by silk screen printing, thereby to form a coat. Thereafter, the coat was irradiated with UV light to be cured. It is noted that the thickness of the coat was varied when the coat was formed, so that the thickness of the ink receiving layer after curing of the coat varies as illustrated in Table 3. Accordingly, an intended optical disk was obtained.

(Evaluation of Spread Rate)

The spread rates of Samples 4-1 to 4-5 obtained as described above were calculated in a similar manner to those of Samples 2-1 to 2-4.

Next, the calculated spread rates were evaluated according to the following criteria.

Excellent: Spread value is less than 40%.

Good: Spread value is not less than 40% and less than 50%.

Fair: Spread value is not less than 50% and less than 60%.

Poor: Spread rate is not less than 60%.

(Evaluation of Skew)

The optical disks of Samples 4-1 to 4-5 obtained as described above were evaluated for skew (warpage). Next, the measured skew was evaluated according to the following criteria.

Excellent: Skew is less than 0.1 degrees.

Good: Skew is not less than 0.1 degrees and less than 0.2 degrees.

Fair: Skew is not less than 0.2 degrees and less than 0.4 degrees.

Poor: Skew is not less than 0.4 degrees.

Table 3 illustrates evaluation results of the optical disks of Samples 4-1 to 4-5.

TABLE 3

|  | Oil absorption amount of silica [ml/100 g] | Average particle size of silica [μm] | Formulation amount of silica [at %] | Thickness of receiving layer [μm] | Spread amount [%] | Skew (warpage of disk) |
|---|---|---|---|---|---|---|
| Sample 4-1 | 1 | 0.5 | 30 | 0 to 5 | Poor | Excellent |
| Sample 4-2 | 1 | 0.5 | 30 | 5 to 10 | Poor | Good |
| Sample 4-3 | 1 | 0.5 | 30 | 10 to 15 | Good | Good |
| Sample 4-4 | 1 | 0.5 | 30 | 15 to 20 | Good | Good |
| Sample 4-5 | 1 | 0.5 | 30 | 20 to 25 | Excellent | Poor |

From the above evaluation results, it can be seen that the thickness of the ink receiving layer is preferably not less than 10 μm and not more than 25 μm, and more preferably not less than 20 μm and not more than 25 μm, from the viewpoint of inhibiting the spread rate.

It can be seen that the thickness of the ink receiving layer is preferably more than 0 μm and not more than 20 μm, and more preferably more than 0 μm and not more than 5 μm, from the viewpoint of inhibiting warpage of the optical disk.

It can be seen that the thickness of the ink receiving layer is preferably not less than 10 μm and not more than 20 μm, from the viewpoint of balancing between the inhibition of a spread rate and the inhibition of warpage of an optical disk.

The embodiments and examples of the present application have been specifically described above. However, the present application is not limited to the above-described embodiments or the examples. Various modifications of the present application can be made without departing from the technical spirit of the present application.

For example, the configurations, the methods, the processes, the shapes, the materials, the numerical values, and the like mentioned in the above-described embodiments are merely examples. Different configurations, methods, processes, shapes, materials, numerical values, and the like may be used, as necessary.

Further, configuration, methods, processes, shapes, materials, numerical values and the like in the above-described embodiments may be combined insofar as they are not departing from the spirit of the present disclosure.

Additionally, the present application may also be configured as below.

(1) A recording medium including:

an ink receiving layer, wherein the ink receiving layer includes a hydrophilic resin and a low oil absorbing porous silica.

(2) The recording medium according to (1), wherein the low oil absorbing porous silica has an oil absorption amount of not more than 15 ml/100 g.

(3) The recording medium according to (1) or (2), wherein the low oil absorbing porous silica has an average particle size of not more than 5 μm.

(4) The recording medium according to any one of (1) to (3), wherein a content of the low oil absorbing porous silica in the ink receiving layer is not less than 20 at % and not more than 30 at %.

(5) The recording medium according to any one of (1) to (4), wherein a spread rate when printing ink is placed on the ink receiving layer is not more than 10%.

(6) The recording medium according to any one of (1) to (5), wherein the ink receiving layer has a thickness of not less than 10 μm and not more than 20 μm.

(7) The recording medium according to any one of (1) to (6), wherein the ink receiving layer includes a fixing agent.

(8) The recording medium according to (7), wherein the fixing agent electrically combines with the hydrophilic resin.

(9) The recording medium according to any one of (1) to (8), wherein the hydrophilic resin is a cationic hydrophilic resin.

(10) The recording medium according to any one of (1) to (9), further including:
a base layer disposed under the ink receiving layer.

(11) A manufacturing method of a recording medium, the method including:
applying a paint containing a hydrophilic resin and a low oil absorbing porous silica; and
emitting UV light on the applied paint for curing.

(12) The manufacturing method of a recording medium according to (11), wherein the applying of a paint is performed by silk screen printing.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recording medium comprising:
a base layer; and
an ink receiving layer provided on the base layer and including
a hydrophilic resin, and
a porous silica in particle form that has an oil absorption amount of not more than 15 ml/100 g.

2. The recording medium according to claim 1, wherein the porous silica has an average particle size of not more than 5 μm.

3. The recording medium according to claim 1, wherein a spread rate when printing ink is placed on the ink receiving layer is not more than 10%.

4. The recording medium according to claim 1, wherein the ink receiving layer has a thickness of not less than 10 μm and not more than 20 μm.

5. The recording medium according to claim 1, wherein the ink receiving layer includes a fixing agent.

6. The recording medium according to claim 5, wherein the fixing agent electrically combines with the hydrophilic resin.

7. The recording medium according to claim 1, wherein the hydrophilic resin is a cationic hydrophilic resin.

8. A manufacturing method of a recording medium, the method comprising:
applying a paint to a base layer, the paint including a hydrophilic resin and a porous silica, the porous silica being in particle form and having an oil absorption amount of not more than 15 ml/100 g; and
emitting UV light on the applied paint for curing.

9. The manufacturing method of a recording medium according to claim 8, wherein the applying of the paint is performed by silk screen printing.

* * * * *

UNITED STATES PATENT AND TRADEMARK OFFICE
CERTIFICATE OF CORRECTION

PATENT NO.         : 9,685,188 B2
APPLICATION NO.    : 14/666960
DATED              : June 20, 2017
INVENTOR(S)        : Satoshi Tada It is certified that error appears in the above-identified patent and that said Letters Patent is hereby corrected as shown below:

On the Title Page

Insert:
--Foreign Application Priority Data
March 31, 2014 (JP).....2014-074951--

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*